(12) United States Patent
McGowan

(10) Patent No.: US 6,931,017 B2
(45) Date of Patent: Aug. 16, 2005

(54) BURST RATIO: A MEASURE OF BURSTY LOSS ON PACKET-BASED NETWORKS

(75) Inventor: James William McGowan, Howell, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 821 days.

(21) Appl. No.: 09/773,799

(22) Filed: Feb. 1, 2001

(65) Prior Publication Data

US 2002/0154641 A1 Oct. 24, 2002

(51) Int. Cl.$^7$ .......................... H04L 12/28; H04L 12/56
(52) U.S. Cl. ........................ 370/401; 370/402; 370/404
(58) Field of Search ............................... 370/401, 402, 370/404, 242, 310, 230, 231, 232, 233, 234, 235, 395.1, 253, 252, 254; 714/748, 738, 749, 788, 786, 787, 762, 761; 709/223, 224

(56) References Cited

U.S. PATENT DOCUMENTS

| | | | | |
|---|---|---|---|---|
| 4,918,687 A | * | 4/1990 | Bustini et al. | 370/235 |
| 5,280,483 A | * | 1/1994 | Kamoi et al. | 370/234 |
| 5,335,222 A | * | 8/1994 | Kamoi et al. | 370/230 |
| 5,483,525 A | * | 1/1996 | Song et al. | 370/392 |
| 5,563,895 A | * | 10/1996 | Malkamaki et al. | 714/748 |
| 5,583,857 A | * | 12/1996 | Soumiya et al. | 370/233 |
| 5,790,521 A | * | 8/1998 | Lee et al. | 370/230 |
| 6,002,688 A | * | 12/1999 | Song | 370/395.3 |
| 6,044,147 A | * | 3/2000 | Hollier | 379/338 |
| 6,490,249 B1 | * | 12/2002 | Aboul-Magd et al. | 370/232 |
| 6,496,481 B1 | * | 12/2002 | Wu et al. | 370/242 |
| 6,597,660 B1 | * | 7/2003 | Rueda et al. | 370/230.1 |
| 6,741,569 B1 | * | 5/2004 | Clark | 370/252 |
| 6,744,757 B1 | * | 6/2004 | Anandakumar et al. | 370/352 |
| 2002/0057650 A1 | * | 5/2002 | Chuah et al. | 370/232 |
| 2002/0101886 A1 | * | 8/2002 | Jagadeesan | 370/516 |

OTHER PUBLICATIONS

A. Chockalingnam et al., "Performance of TCP On Wireless Fading Links With Memory", *IEEE International Conference on Communications*, Atlanta, GA Jun. 7–11, 1998, *ICC 98 Conference Record*, pp 595–600.

ITU–T Recommendation G.711 —Appendix I, "A high quality low–complexity algorithm for packet loss concealment with G.711"; Sep., 1999.

ITU–T Recommendation G.191, "Software tools for speech and audio coding standardizaton;" Nov., 1996.

ITU–T Recommendation G.107, "E–model, a computational model for use in transmission planning;" May, 2000.

ITU–T Software Tool Library Manual, TTU–T Users' Group on Software Tools, May 1996; (especially, Chapter 4, pp. 55–69).

Horn, U., et al.: "Robust Interactive Video Transmission Based on Scalable coding and Unequal Error Protection", Signal Proceesing Image Communication, Elsevier Science Publishers, Amsterdam, nl, vol. 15, No. 1–2, Sep. 1999, pp. 77–94, XP004180639, ISSN: 0923–5965.

(Continued)

*Primary Examiner*—Wellington Chin
*Assistant Examiner*—Jamal A. Fox

(57) ABSTRACT

A "Burst Ratio" is defined for use as a measure of the burstiness of a packet-based network. One illustrative implementation of the Burst Ratio (R) is where R is equal to the ratio of the average length of observed bursts in a packet arrival sequence over the average length of bursts expected for a random loss packet-based network. Another illustrative implementation of the Burst Ratio (R) is in the context of a 2-state Markov model, wherein $R=1/(1+\alpha-\beta)$, and $\alpha$ is the probability of losing packet n if packet n−1 was found (i.e., the probability of losing the next packet if the current packet was received) and $\beta$ represents the probability of losing packet n if packet n−1 was lost (i.e., the probability of losing the next packet if the current packet was lost).

45 Claims, 4 Drawing Sheets

OTHER PUBLICATIONS

Bjorkman, N., et al.: "The Cell Loss Process in ATM Networks and it's Impact on Quality of Service" Local Computer Networks, 1995, Proceedings, 20$^{th}$, conference on Minneapolis, MN, USA, Oct. 16–19,1995, pp280–288, XP010196345, ISBN: 0–8186–7162–9.

Joe, I.: "Packet Loss and Jitter Control for Real–Time MPEG Video Communications", Computer Communications, Elsevier Science Publishers BV, Amsterdam, NL, vol. 9, No. 11, Sep. 1, 1996, pp. 901–914, XP004052775, ISSN: 0140–9664.

Cidon, I. et al.: "Analysis of Packet Loss Porcesses in High–Speed Networks", Electrical and Electronics Engineersin Israel, 1991. Proceedings., 17$^{TH}$, Convention of Tel Aviv Israel, Mar 5–7, 1991, pp. 404–407, XP010041249, ISBN: 0–87942–678–0.

Schulzrinne. H. et al.: "Loss Correlation for Queues with Bursty Input Streams", Discovering a New World of Communications, Chicago, Jun. 14–18, 1992, whole document.

* cited by examiner

US 6,931,017 B2

BURST RATIO: A MEASURE OF BURSTY LOSS ON PACKET-BASED NETWORKS

FIELD OF THE INVENTION

This invention relates generally to communications and, more particularly, to packet communications systems.

BACKGROUND OF THE INVENTION

Packet-based networks, such as those based on Internet Protocol (IP) or Asynchronous Transfer Mode (ATM) technologies, are frequently being used to deliver real-time voice and video services. Virtually all telecommunication services—including those using wire, optical fiber or wireless transport—are expected to be packet based within the next few years.

All packet-based networks are subject to packet loss. For example, packet loss occurs when either a router or other piece of hardware becomes temporarily unable to meet its bandwidth demand, or when interference occurs in a wireless link. For real-time applications such as telephony, packet loss also occurs when a packet fails to reach its destination within some specified period of time. Various strategies are in place to deal with packet loss. Foremost, careful network planning can be used to avoid congestion and reduce overall loss rates. Although critical, this alone is not enough, and often means costly over-provisioning to handle peak demand times. As such, Quality-of-Service (QoS) metrics can be used to prioritize packets, and relegate loss to less critical or non-real-time streams of information; the Transmission Control Protocol is used with IP (TCP/IP) to request that lost packets be resent when time allows; and Packet loss concealment (PLC) or Error Concealment (EC) strategies are used in voice applications to minimize the perceptual effect of lost packets on the end-user (e.g., see International Telecommunications Union (ITU)-T G.711 Appendix I). In addition, voice and video encoding algorithms that are inherently more resilient to loss can be used.

Ultimately, the success or failure of any scheme used to conceal error will depend on an end-users perception of transmission quality. Due to both cognitive and algorithmic factors, the perception of quality is dependent upon the patterns of loss observed on the network. It has long been observed that loss on packet-based networks is bursty. That is, the loss tends to occur such that sequential strings of packets are lost. Accordingly, many models of packet loss are based upon a 2-state Markov model, which can account for the observation that a packet is more likely to be lost if the immediately preceding packet was lost.

As such, the burstiness of loss is critical in assessing the performance of methods to minimize loss effects, whether they are PLC schemes or advanced routing algorithms. Unfortunately, there is no clear metric of how bursty a network is.

SUMMARY OF THE INVENTION

A "Burst Ratio" is defined for use as a measure of the burstiness of a packet-based network. In particular, a packet server determines a Burst Ratio for a received packet stream. The Burst Ratio is based on (a) the observed packet loss for the received packet stream over a period of time, and (b) the expected packet loss for the received packet stream for a random loss packet-based network.

In an illustrative embodiment, a packet-based network comprises a number of packet servers. At least one of the packet servers measures a Burst Ratio for a received packet stream to determine a level of burstiness for the packet-based network and alters processing of the received packet stream as a function of the measured Burst Ratio. For example, if the measured Burst Ratio is above a predefined value, this packet server alters an associated priority level for the received packet stream, e.g., by increasing the priority level for retransmission.

In another illustrative embodiment, a component, e.g., a packet server, for use in a packet-based network measures a Burst Ratio for a received packet stream. This measured Burst Ratio is then used as a score that is associated with the component for use in transmission planning.

One illustrative implementation of the Burst Ratio (R) is where R is equal to the ratio of the average length of observed bursts in a packet arrival sequence over the average length of bursts expected for a random loss packet-based network.

Another illustrative implementation of the Burst Ratio (R) is in the context of a 2-state Markov model, wherein $R=1/(1+\alpha-\beta)$, and $\alpha$ is the probability of losing packet n if packet n=1 was found (i.e., the probability of losing the next packet if the current packet was received) and $\beta$ represents the probability of losing packet n if packet n−1 was lost (i.e., the probability of losing the next packet if the current packet was lost).

DETAILED DESCRIPTION

Figure 1:
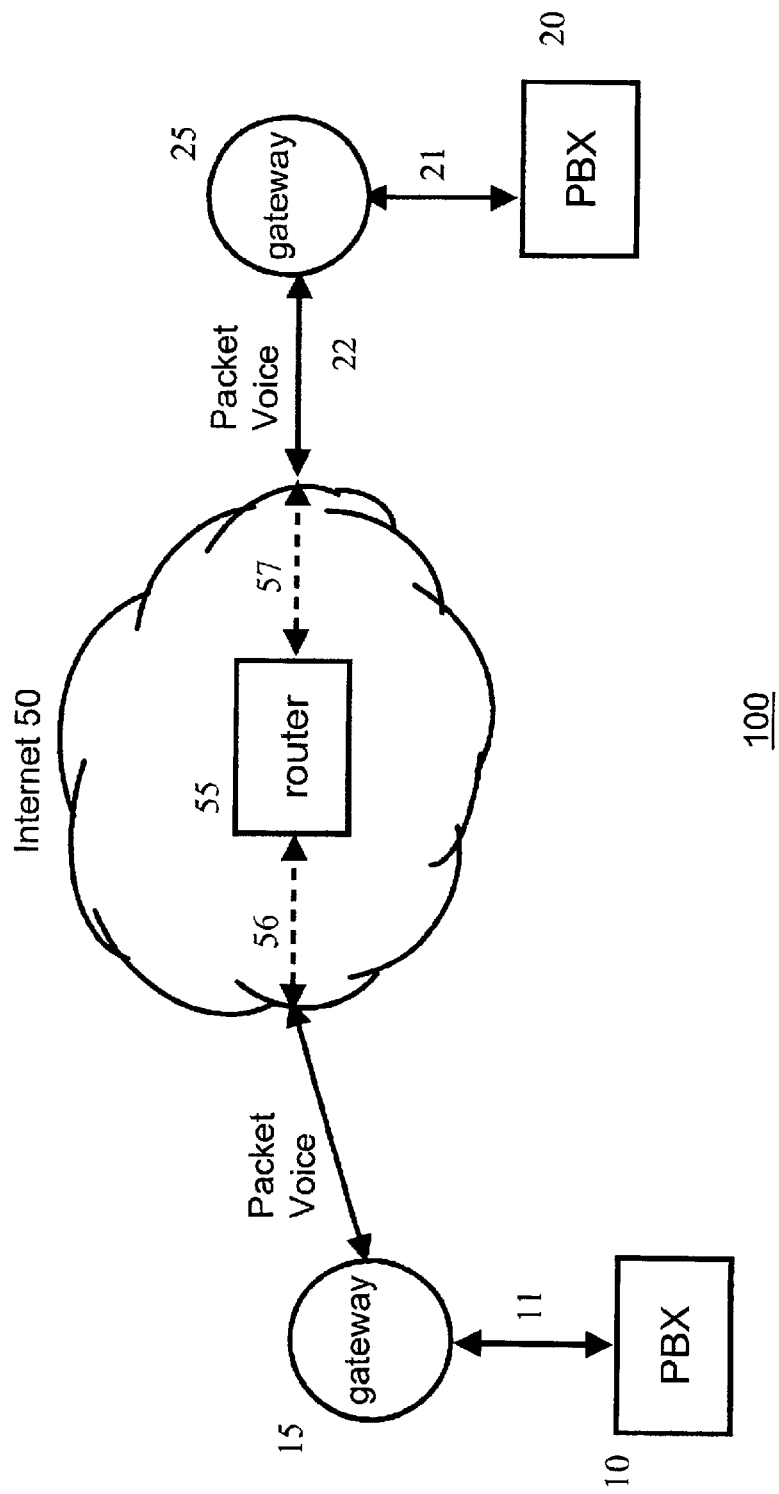
FIG. 1 shows an illustrative packet-based network embodying the principles of the invention.

The following notation and definitions are presented for describing packet loss.

A signal is divided into packets by a sending application, and packets are reassembled by a receiving application. The terms "sending application" and "receiving application" are meant to be very general, and may describe the communication between the end-points of a communication link (e.g., between gateway 15 and gateway 25 of FIG. 1 (described further below)), either end-point and an intermediate device (e.g., between gateway 25 and router 55 of FIG. 1), or any two intermediate devices.

The term arrival status refers to the state of the packet at the time the packet must be played out by the receiving application. For the purposes of re-assembly, the arrival status of a packet can be either lost or found.

A packet is said to be lost if it fails to reach a receiving application within a pre-specified period of time for any reason. (This pre-specified period of time is a component of the delay between the sending and receiving ends, and is ideally as small as possible for most applications.)

A packet is said to be found if it succeeds in reaching a receiving application and is available for playback within a pre-specified period of time.

A loss sequence (also referred to herein as an arrival sequence) is a series of lost and found packets. For example, assume a received packet stream comprises the following loss sequence of 40 packets:

FFFFFLFFLLFLLFFFFLFFLLLLLFLLFLFFFFFFFFFF, (1.0)

where a lost packet is represented by a capital, monospace L, and a found packet is represented by a capital, monospace F. A loss burst or, simply, a burst, is a series of consecutively lost packets within the loss sequence. The loss sequence (1.0) shown above has 7 such bursts. Loss sequence (1.0) is repeated below, with the bursts highlighted (and also labeled 1 through 7):

FFFFFLFFLLFLLFFFFLFFLLLLLFLLFLFFFFFFFFFF (1.1)
     1  2  3      4 5    6  7

The term burst length refers to the number of packets in a single loss burst. The burst length of the bursts in loss sequence (1.0) are 1, 2, 2, 1, 5, 2 and 1, respectively. The mean burst length (MBL) is the mean of all the burst lengths in a loss sequence, and is given by $$MBL = \frac{\sum_{b=1}^{number\ of\ bursts} burst\ length_b}{number\ of\ bursts}, \quad (1.2)$$

where b is a particular burst. With respect to the illustrative loss sequence (1.0), the mean burst length is (1+2+2+1+5+2+1)/7=2.

The term loss rate refers to the proportion of packets lost in the loss sequence.

The arrival of each packet is often modeled as an independent "trial" whose outcome is either found or lost. Such trials can be considered as Bernoulli distributed random variables, with parameters being the probability that a packet is found. A packet is found with probability p and lost with probability 1−p.

If the probability of a packet being lost or found is independently and identically distributed for each packet (i.e., each packet is found with the same probability p, where $0 \leq p \leq 1$), then the loss pattern is defined herein as "random." In other words, the term "random" loss applies to packet networks where each packet is lost with equal probability.

In general, if the arrival of a packet depends on the lost or found state of prior packets, then the loss is characterized as "bursty." (Typically the supposition is made that the probability of losing a packet must increase if prior packets have been lost, and here the definition of a bursty network will be limited to this case.) In practice this general definition is rarely used. Rather, loss is considered bursty if the probability of losing a packet increases when the immediately preceding packet is lost. Bursty behavior is characterized by burst lengths that are, on average, longer than those produced by "random" loss.

There exists a theoretical possibility that the probability of losing a packet will decrease when the immediately preceding packet is lost. The term "scattered" is introduced here to describe this type of packet loss. By definition, scattered behavior tends to produce burst lengths shorter than those produced by random loss. This may occur, for instance, in a network or buffer queue that gives higher priority to a stream that has just lost a packet. The critical difference, then, between "random," bursty, and scattered loss are seen in the expected size of burst lengths.

At this point, before describing the inventive concept, a brief review is provided of 2-state Markov models for use in packet-based networks. If the reader if familiar with this background, simply skip-ahead to the section entitled "Burst Ratio."

2-State Markov Models

As known in the art, a packet loss model can also be described in the context of Markov models. The latter are used to describe the behavior of systems that transition among a finite number of "states". In the case of packet loss models, as noted above, there are exactly two states: lost and found—hence a 2-state Markov model is used. In the 2-state Markov model, the probability of transitioning from one state to another (e.g., the probability of losing the next packet if the current packet was found) is dependent only upon the current state. As such, the 2-state Markov model is somewhat restrictive since the probability of losing the next packet in a sequence depends solely on whether the current packet is lost or found. However, as a simple model it approximates actual loss patterns far better than "random" loss, and may be a close enough approximation for many applications.

The illustrative loss sequence (1.0) (above) can be considered a Markov chain if the assumption is made that the arrival status of packet n is dependent upon the arrival status of packet 1, 2, . . . , n−1. If the phenomena being modeled is jointly dependent upon all these states, it is best described by an n-state Markov model. If the arrival status of packet n is only dependent upon the preceding packet, a 2-state Markov model may be used.

Every Markov model is uniquely described by a transition matrix. A transition matrix lists the probabilities of switching from one state to another. An illustrative transition matrix for a 2-state Markov model is shown in the table below.

|  | packet n found | packet n lost |
|---|---|---|
| packet n−1 found | .99 | .01 |
| packet n−1 lost | .55 | .45 |

This table lists the probabilities of switching from the lost or found state at packet n−1 to the lost or found state at packet n. If the previous packet n−1 has been found, the probability of the next packet n being found is 0.99. The probability of switching or transitioning to the loss state (losing the next packet) is 0.01. However, if the current packet is lost, the probability of the next packet being found is reduced to 0.55, and the probability that the next packet will also be lost is increased to 0.45. The more familiar matrix notation is:

$$M = \begin{Vmatrix} .99 & .01 \\ .55 & .45 \end{Vmatrix}. \quad (2.0)$$

The table representation and the matrix notation represent identical Markov models. It could be observed that a network modeled with the transition matrix (2.0) would exhibit bursty behavior, since losing a packet substantially increases the probability from 0.01 to 0.45 that the next packet will also be lost. (This model is consistent with, and possibly even typical of, actual measurements of the performance of IP networks.)

As known in the art, the notation illustrated in (2.0) can be generalized to:

$$M = \left\| \begin{matrix} 1-\alpha & \alpha \\ 1-\beta & \beta \end{matrix} \right\|. \tag{2.1}$$

Each row in a transition matrix must sum to 1. This result is intuitively clear, since it simply means that no matter what the status of packet n−1, packet n must be either lost or found. Since all rows must sum to 1, there are only 2 free parameters in the model. In this case, α is used to define the probability of transitioning from found to lost, and β is used to define the probability of remaining in the loss state once a loss burst has begun.

It is assumed that M is ergodic, which means that the model will never fall permanently into the lost or found state, and that it doesn't transition deterministically out of any state with probability 1. By asserting that α and β must be between, but never equal to 0 or 1, M is guaranteed to be ergodic. As defined herein, for a packet-based network exhibiting bursty loss, β>α. For a packet-based network exhibiting random loss, β=α.

In terms of a packet loss model, it is tempting to think of α as the "overall loss" and β as the "burstiness" of the network. However, neither is accurate. As known in the art, for Markov models it is the limiting probability of the loss state, and not α, that gives the overall loss. The term α gives the probability that the network will transition into the loss state from the found state only. However, the network can also reach the loss state from the loss state, and does so with probability β. Both cases contribute to the overall loss rate. The proportion of packets lost within an entire sequence (or, more precisely, the long-run average number of packets lost in a particular network) is the overall loss. For a 2-state Markov model, the method of calculating the overall loss, L, is:

$$L = \frac{\alpha}{1+\alpha-\beta}, \tag{2.2}$$

which is a shortened result of the general method for the calculation of a limiting probability for a given state of a Markov chain (e.g., see Ross (1993), *Introduction to Probability Models, fifth edition*. Academic Press: San Diego).

Defining the burstiness of loss is a more complex issue. Although (2.1) presents a clear definition of overall loss—there is no such corresponding definition of burst.

It should be noted that some in the art may associated burst as a function of β alone. However, it is easy to demonstrate that using β alone as a definition fails to meet the simplest of intuitive notions about burst. For example, consider a network modeled with a 2-state Markov model in which β=ρ, where 0≤ρ≤1, and is a constant. Such a network will exhibit "random" loss if α=ρ, since the probability of losing packet n+1 will not depend in any meaningful way upon the status of packet n. In this case, the Markov model would be defined by $$M = \left\| \begin{matrix} 1-\rho & \rho \\ 1-\rho & \rho \end{matrix} \right\|. \tag{2.3}$$

From the transition matrix of (2.3), if packet n−1 was lost, packet n will be lost with probability ρ. If packet n−1 was found, packet n will be lost with the same probability ρ. Thus, the packet-based network exhibits non-bursty, "random" loss.

Now consider the case in which α<ρ. Such a network will exhibit bursty behavior, since the probability of losing packet n given packet n−1 is found (a) is less than the probability of losing packet n given packet n−1 is lost (ρ).

Notice that in both cases, β was held constant at ρ. However, the first network will exhibit non-bursty, "random" loss, and the second network will exhibit bursty loss. Burstiness must therefore not be characterized solely by β. Somehow α must be involved in the definition of burst. (It should be noted that a third case is also possible, in which α>ρ. Such a network will exhibit scattered behavior, since the probability of losing a packet decreases if a packet has just been lost.)

As noted above, burst length is defined as the number of consecutively lost packets in a loss burst. Assuming the packet-based network has transitioned into the loss state from the found state at packet n−1, the probability of returning to the found state in exactly i packets is represented by a probability density function G:

$$G(i,\beta) = \beta^{i-1}(1-\beta), \text{ for } i=1, 2, \tag{2.4}$$

which is the definition of a Geometric or Pascal distributed random variable as known in the art. Equation (2.4) represents that there must first be i−1 failures to return to the loss state, with a successful return on the $i^{th}$ packet. The number of consecutively lost packets, accounted for by G, is i−1. However, G only applies once the model has transitioned into the loss state. In other words, the loss sequence described by G is predicated on a single lost packet at time 0 with probability 1. Then, for any given i, lost packets 1, 2, ..., i−1 each occur with probability β. The packet i is found (with probability 1−β), so it does not count as part of the loss sequence. The loss sequence itself, is therefore a series of packets 0, 1, ..., i−1. This loss burst has a burst length of i.

The mean burst length is given, then, by first finding the expectation of G(i;β), $$MBL_B = E[G] = \frac{1}{1-\beta}. \tag{2.5}$$

Equation 2.5 is known in the art (e.g., see Ross (1993), *Introduction to Probability Models, fifth edition*. Academic Press: San Diego). Equation (2.5) is also referred to as the Mean Burst Length, or MBL. The B subscript stands for burst, to distinguish this from other types of mean burst lengths presented later.

Burst Ratio

Although equation (2.2) specifies the overall loss for a 2-state Markov model, overall loss can be generally defined independent of any specific model of loss. For example, suppose that an application sends T packets in a given period of time. Let t be the number of packets that are lost by the receiving application. The overall loss parameter is then:

$$L = \frac{t}{T}, \tag{2.6}$$

which gives the proportion of lost packets.

Consider that a loss sequence like (1.0) is observed for some period of time on a given network, and is determined to experience overall loss L as defined in (2.6). If the packet loss were "random," the mean burst length of this "random" loss is given by:

$$MBL_R = \frac{1}{1-L}. \quad (2.7)$$

This result follows if one considers that in a "random" model the probability of losing a packet is L. Thus, L substituted for $\beta$ from equation (2.5).

The observed mean burst length of the loss sequence $MBL_B$ can be calculated according to equation (1.2). Recall that equation (1.2) is the average burst length for an observed loss sequence.

Thus, and in accordance with the invention, the Burst Ratio is defined as:

$$R = \frac{MBL_B}{MBL_R}. \quad (2.8)$$

In other words, the Burst Ratio, R, is defined as the ratio of the observed burst length to the burst length expected for "random" packet loss. (Or as illustrated in equation (2.8), the ratio of the average length of observed bursts in an arrival sequence over the average length of bursts expected for the network under "random" loss.) The Burst Ratio has the following desirable properties:

(i) if R>1, the network is exhibiting bursty loss;
  (ii) if R=1, the network is exhibiting random loss; and
  (iii) if R<1, the network is exhibiting scattered loss.

These properties hold for any loss rate. The interpretation of R is straightforward. If R=2, then network loses packets in bursts twice as long as expected under random loss. If R=0.5, then the network loses packets half as long as expected under random loss. If R=1, then the network is losing packets at random.

Intuitively, the Burst Ratio measures to what extent bursts are longer than one would expect from simply losing packets at random. As the total loss increases one expects to see longer chains of loss. For a non-bursty network (i.e., "random" loss), the average burst length would vary as a function of the total loss, but the Burst Ratio would remain constant at R=1. As the burstiness of the network increases, so does R, even if the total loss rate remains the same. So, for a fixed number of lost packets with a given period of time, the tendency of these packets to group together in contiguous streams is given by the Burst Ratio R.

It is important to note that the Burst Ratio is not dependent on the Markov model of loss, i.e., the L and R parameters defined above are independent of any specific model of loss. However, for a given Markov model a unique Burst Ratio can be computed (as described further below). (In other words, the Burst Ratio is a more general measure than the 2-state Markov model, although it is well suited for use with the 2-state Markov model.)

Indeed, it can be shown that the Burst Ratio, R, can be derived from a 2-state Markov model, using a procedure called the Loss-Burst (L-R) Transform. The L-R Transform converts the parameters of a 2-state Markov model to the overall loss L and Burst Ratio R.

The Loss-Burst or L-R Transform is a re-parameterization of $\alpha$ and $\beta$ into L and R. This parameterization gives a clear description of total loss and burst for a given 2-state Markov model. As discussed earlier, L and R express the overall loss and burstiness directly, whereas $\alpha$ and $\beta$ do not.

From equation (2.8), the term $MBL_B$ is calculated from equation (2.5). Similarly, equation (2.7) is used to calculate $MBL_R$. This yields:

$$R = \frac{\frac{1}{1-\beta}}{\frac{1}{1-L}} = \frac{1-L}{1-\beta}. \quad (3.0)$$

Substituting equation (2.2) yields:

$$R = \frac{1 - \frac{\alpha}{1-\beta+\alpha}}{1-\beta} = \frac{1}{1+\alpha-\beta} = \frac{L}{\alpha}. \quad (3.1)$$

Thus, the Burst Ratio, R, is expressed in terms of the $\alpha$ and $\beta$ parameters from a 2-state Markov model.

Conversely, there is an inverse L-R Transform, which converts L and R into a unique 2-state Markov model. In particular, from equation (3.1), the following equation relating the overall loss, L, to the Burst Ratio, R, can be written:

$$L = \alpha R. \quad (3.2)$$

Or, $$\alpha = \frac{L}{R}. \quad (3.3)$$

Since $\alpha$ and L are probabilities and the Markov model must be ergodic, (i.e., $0<\alpha<1$ and $0<L<1$), values of R must be constrained appropriately.

Similarly, equation (3.1) can be solved for $\beta$, yielding:

$$\beta = \frac{(R-1+R\alpha)}{R}. \quad (3.4)$$

Equation (3.4) can be simplified to:

$$\beta = \frac{R-1+L}{R}. \quad (3.5)$$

Again, R must be constrained so that $0<\beta<1$.

As described above, the Burst Ratio, R, was defined specifically on the length of loss sequences. This term is valid for 2-state models, because they can be viewed as alternating samples from two geometrically random distributed variables, differentiated by parameters $\alpha$ and $\beta$. More complex models look at dependencies that extend beyond a single packet. For instance, some observations of live networks have shown that the arrival status of packet n correlated with the arrival status of packets n+1, n+2, ..., n+i. In practice, significantly higher correlations are found as high as i=4, although there is no consensus estimate, and new or currently unknown network configurations will undoubtedly show different behaviors. In general, if a model demonstrates correlations as far out a i packets, then it cannot be characterized completely by less than i measures. One way to extend the Burst Ratio is to calculate $$R(i) = \frac{\text{Proportion of packets lost at } n+i \text{ if packet } n \text{ is lost}}{\text{Proportion of packets expected to be lost at } n+i \text{ if packet } n \text{ is lost under "random" loss}} \quad (3.6)$$

which produces a vector of numbers. Notice that i can be set to have an arbitrary maximum in practice. Or, i can be incremented until R(i) is not sufficiently different from unity, indicating that there are no longer significant correlations.

The terms in R(i) have the same properties (i) through (iii) as the term R. Different network configurations may consistently produce vectors that resemble known, parameterized distributions, such as the geometric distribution. Accordingly, R(i) may be described by fewer numbers. One would simply indicate that R(i) follows a particular distribution or form, which can be completely described by as few as 1 or 2 parameters.

Turning now to FIG. 1, an illustrative packet-based network, 100, in accordance with the principles of the invention, is shown. Other than the inventive concept, the elements shown in FIG. 1 are well-known and will not be described in detail. For example, although shown as a single block element, Private Branch Exchange (PBX) 10 includes stored-program-control processors, memory, and appropriate interface cards. Packet-based network 100 includes a plurality of gateways as represented by gateway 15 and gateway 25 coupled via Internet 50. The latter is representative of any Internet-Protocol (IP) based network infrastructure and includes a representative router 55 along with other components (not shown) like other routers, etc., for communicating IP packets between packet endpoints. Also shown in FIG. 1 are a plurality of switching elements as represented by PBX 10 and PBX 20. (Alternatively, a PBX could be represented by other switching elements, e.g., a central office (CO).) The term "packet server" as used herein refers to any packet processor, illustrations of which (other than the inventive concept) are routers, gateways, PBXs, etc. Finally, the inventive concept is implemented using conventional programming techniques, which as such, will not be described herein.

For the purposes of this description, it is assumed that packet voice traffic exists between PBX 10 and PBX 20, via gateway 15, gateway 25, and Internet 50, via router 55. (It is assumed that call setup functions are performed as in the prior art and, as such, are not described herein. For example, whether or not endpoints (not shown) coupled to PBX 10 and PBX 20 are International Telecommunications Union (ITU) Standard H.323 clients, as known in the art, are not relevant to the inventive concept.) PBX 10 communicates data, representing a plurality of voice calls, with gateway 15 via facility 11. Similarly PBX 20 communicates data, representing a plurality of voice calls, with gateway 25 via facility 21. Facilities 11 and 21 are representative of any number and type of communications facilities. To facilitate the description it is assumed that these facilities are representative of multiple T1/E1 lines (for each direction), each supporting multiple 64 kb/s (thousand of bits per second) PCM (pulse code modulated) voice connections as known in the art. Although not necessary to the inventive concept, it is assumed for the purposes of this description that the operation of gateway 15 and gateway 25 are similar. Packet streams representing voice are transmitted between gateway 15 and gateway 25 via router 55. The latter is coupled to gateway 15 and gateway 25 via paths 56 and 57, which represent communications facilities and may include other routers, etc., required to communicate packets through Internet 50.

Figure 2:
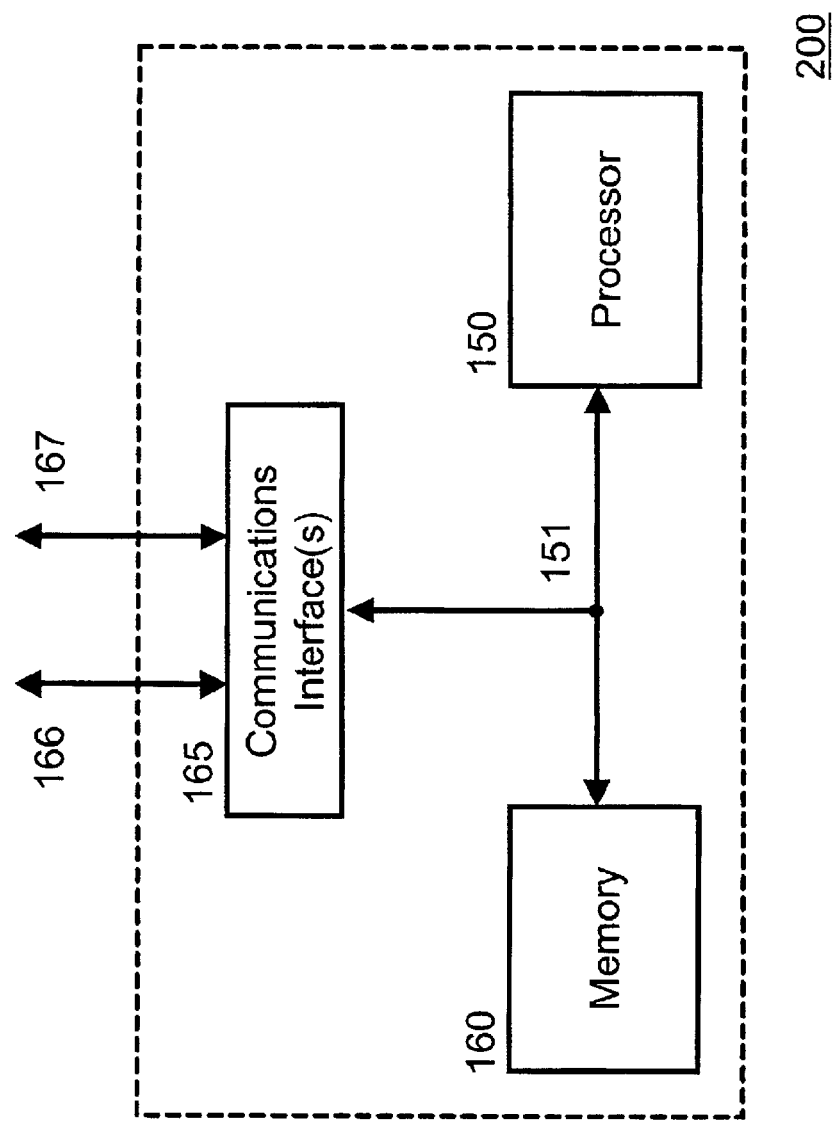
FIG. 2 shows an illustrative high-level block diagram of a packet server for use in accordance with the principles of the invention.

Turning briefly to FIG. 2, an illustrative architecture for a packet server 200 is shown. Packet server 200 is a stored-program-control based processor architecture and includes processor 150, memory 160 (for storing program instructions and data) and communications interface(s) 165 for coupling to one or more communication facilities as represented by paths 166 and 167. As noted above, various ones of the elements of FIG. 1 are representative of packet servers. For example, router 55 has the architecture shown in FIG. 2 and, in this case, communications facilities 166 and 166 represent paths 56 and 57, respectively.

Returning to FIG. 1, gateway 25 converts, and compresses, received PCM voice traffic (from facility 21) into IP packets for transmission to gateway 15, via Internet 50. In this conversion, gateway 25 performs one or more of the following functions: voice compression to lower coding rate (e.g., 32 kb/s ADPCM, 8 kb/s LD-CELP, etc.); silence suppression; assignment of sequence numbers; and background noise level notification. In the opposite direction, gateway 25 depacketizes received IP packets and decompresses voice information into corresponding 64 kb/s audio stream for application to PBX 20. In "playing out" the received IP packets to PBX 20, gateway 25 may, as known in the art, provide: buffering (not shown); a build-out delay; noise fill during silence period; and use sequence numbers to maintain integrity in the play-out process.

Figure 3:
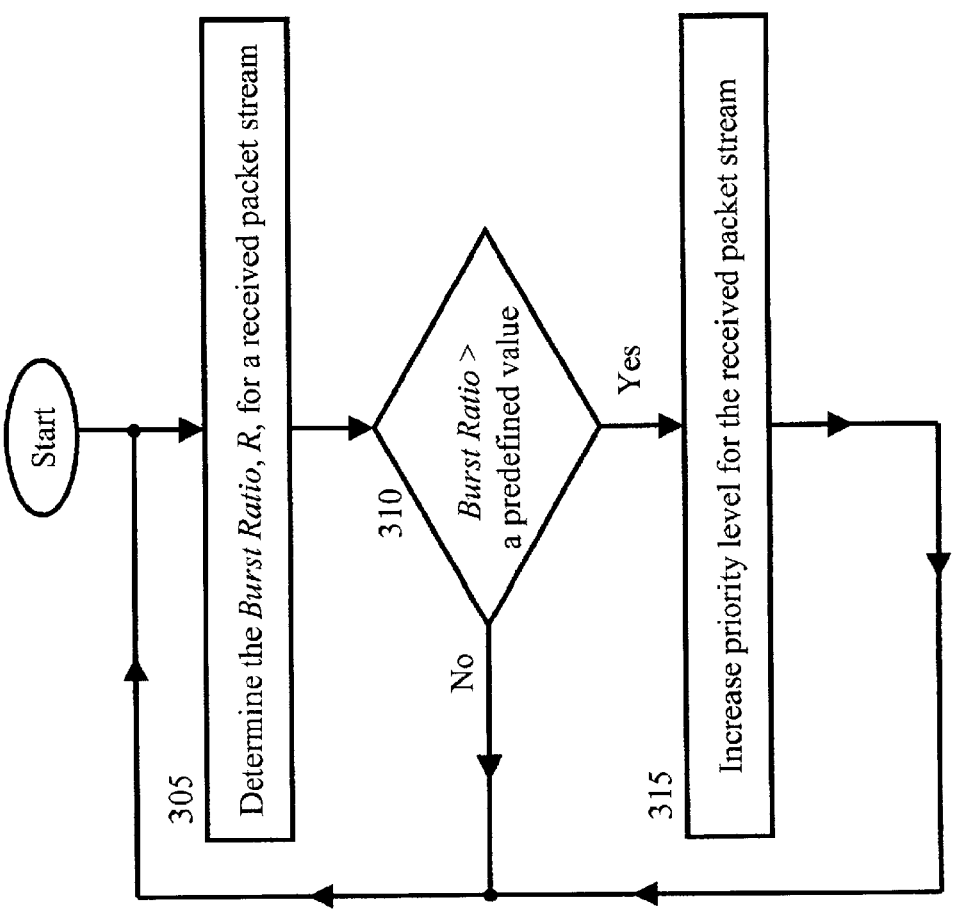
FIGS. 3–4 show illustrative flow charts in accordance with the principles of the invention.

Turning now to FIG. 3, an illustrative flow chart of a method in accordance with the principles of the invention is shown. It is presumed that a packet server, e.g., gateway 25, is suitably programmed to carry out the below-described methods using conventional programming techniques, which, as such, will not be described herein. In step 305, gateway 25 determines a Burst Ratio, R, for a received packet stream (or channel) received via path 22 using, e.g., equation (2.8). In this case, the denominator value ($MBL_R$) can be determined through simulation, or, a 2-state Markov process could be assumed for using equation (2.7), with L illustratively equal to 0.1. The numerator value ($MBL_B$) is determined in real-time using equation (1.2) over some fixed, or variable, period of time (e.g., the most recent 2 seconds). Gateway 25 checks the determined Burst Ratio against a predetermined value (e.g., a value of 1.5) in step 310. If the determined Burst Ratio is less than or equal to the predetermined value, then Gateway 25 continues to determine, i.e., monitor, the Burst Ratio in step 305. On the other hand, if the determined Burst Ratio is greater than the predetermined value, then gateway 25 alters processing of the received packet stream as a function of the measured Burst Ratio. In this example, if the measured Burst Ratio is above a predefined value, gateway 25 increases the priority level for the received packet stream in step 315. In affecting a change of priority, gateway 25 signals other packet servers in the network (e.g., router 55) to increase the priority level for transmission of other packets associated with this packet stream (channel). (Such signaling, e.g., via an in-band or out-of-band control channel, is known in the art and is not described herein.) Alternatively, gateway 25 may increase its priority-handling (e.g., processing) of the received packet stream relative to other received packet streams being handled by gateway 25.

Figure 4:
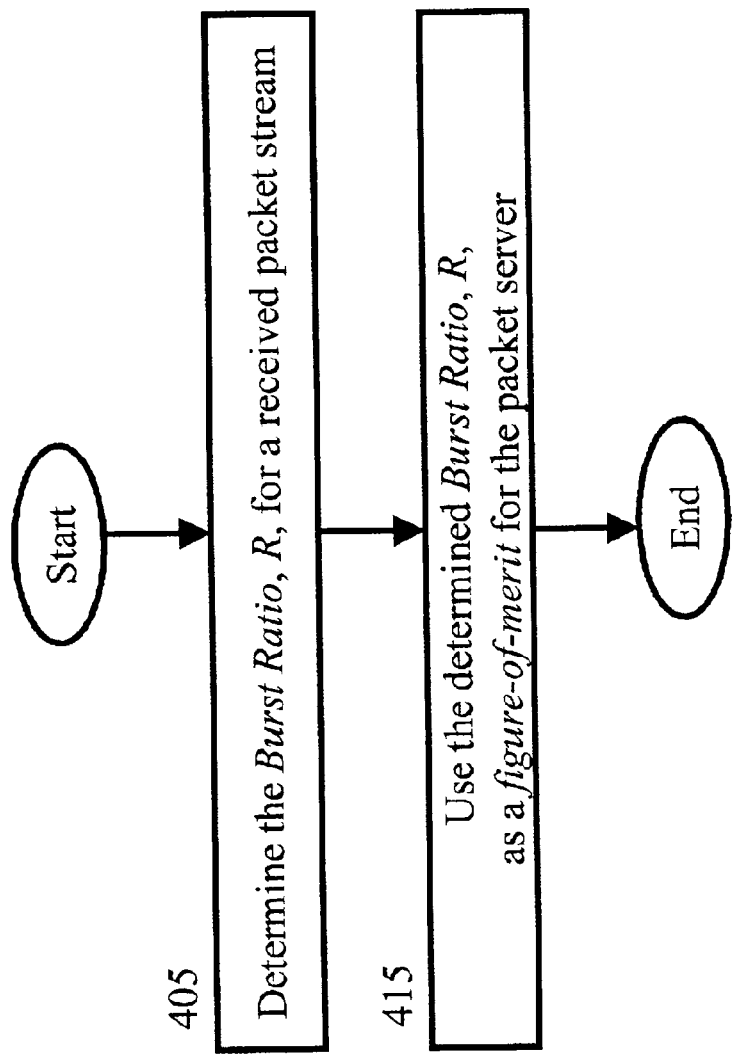

Another illustrative flow chart in accordance with the principles of the invention is shown in FIG. 4 (which is similar to FIG. 3 and, therefore, like steps are not described in detail below). In this application, a packet server is tested either through simulation, or via live traffic, under varying network conditions in order to determine a figure-of-merit as a function of the Burst Ratio, R. (Simulations or actual traffic tests are known in the art and not described herein.) In step 405, a Burst Ratio, R, is determined for a received packet stream (or channel) using, e.g., equation (2.8). In step 415, the Burst Ratio itself is used as a figure-of-merit for the tested packet server. (Alternatively, the figure-of-merit may be some other function of the determined Burst Ratio value.) This figure-of-merit, or score, can, e.g., be used in transmission planning. It should be noted that the method shown in FIG. 4 can be extended to use the Burst Ratio as a figure-of-merit for a proposed network architecture.

As described above, the Burst Ratio, R, provides a way to characterize, or measure, bursty packet loss on a network. The Burst Ratio can capture a number of modes of network performance. In addition, it can be applied to models more complex than the 2-state Markov model. The Burst Ratio is independent of, or orthogonal to the loss rate of the network, and is useful in subjective testing applications, as well as in any specification of network performance. In addition, this specification of Burst Ratio is appropriate for use in the "E-model" (e.g., see ITU-T Recommendation G.107, "The E-model, a computational model for use in transmission planning;" May, 2000), or other situations in which a characterization of the network is needed, including specifications of network performance.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated in the context of Internet telephony, the inventive concept is applicable to other examples of transport networks over which packets of voice or video are transmitted such as wire-less networks, ATM-based networks, frame relay networks, corporate intranets, etc. In addition, although the illustrative embodiment was described in the context of voice services, the inventive concept is applicable to voice, video or any other media (such as the touch, smell and taste interface devices).

What is claimed:

1. A method for use in a packet server, the method comprising the steps of:
   receiving a stream of packets; and
   determining that number of packets from the received packet stream that are lost over a time period;
   determining a number of expected packets to be lost for the received packet stream in accordance with a random loss model; and
   determining a burst ratio from the determined number of packets lost to the number of expected packets to be lost.

2. The method of claim 1 wherein the step of determining the number of packets lost determines an average length of observed bursts in the received packet stream over the time interval.

3. The method of claim 2 wherein the step of determining the number of expected packets to be lost determines an average length of bursts expected for a random loss packet-based network.

4. The method of claim 3 wherein the step of determining the burst ratio determines a ratio of the average length of observed bursts in the received packet stream over the time interval to the average length of bursts expected for a random loss packet-based network.

5. A method for use in a packet server, the method comprising the steps of:
   receiving a stream of packets; and
   determining a burst ratio for the received packet stream, wherein the burst ratio equals $1/(1+\alpha-\beta)$, wherein $\alpha$ is a probability of losing packet n if packet n−1 was found and $\beta$ represents a probability of losing packet n if packet n−1 was lost.

6. A method for use in a packet server, the method comprising the steps of:
   receiving a stream of packets; and
   determining a burst ratio for the received packet stream, the burst ratio being a ratio of a function of experienced packet loss to a loss expectation for the packet stream; and
   changing the processing for the received packet stream as a function of the determined burst ratio.

7. The method of claim 6 wherein the changing step alters a priority level for the received packet stream.

8. The method of claim 6 wherein the determining the burst ratio step includes the steps of:
   determining that number of packets from the received packet stream that are lost over a time period; and
   determining a number of expected packets to be lost for the received packet stream in accordance with a random loss model.

9. The method of claim 6 wherein the determining the burst ratio step includes the steps of:
   determining an average length of observed bursts in the received packet stream over a time interval;
   determining an average length of bursts expected for a random loss packet-based network; and
   determining the burst ratio from the average length of observed bursts and the average length of bursts for the random loss packet network.

10. The method of claim 6 wherein the determining the burst ratio step determines the burst ratio from $1/(1+\alpha-\beta)$, wherein $\alpha$ is a probability of losing packet n if packet n−1 was found and $\beta$ represents a probability of losing packet n if packet n−1 was lost.

11. A method for use in a packet server, the method comprising the steps of:
    receiving a stream of packets; and
    determining a burst ratio for the received packet stream, the burst ratio being a ratio of a function of experienced packet loss to a loss expectation for the packet stream; and
    associating the determined burst ratio as a figure of merit for the packet server for use in traffic planning.

12. The method of claim 11 wherein the determining the burst ratio step includes the steps of:
    determining that number of packets from the received packet stream that are lost over a time period; and
    determining a number of expected packets to be lost for the received packet stream in accordance with a random loss model.

13. The method of claim 11 wherein the determining the burst ratio step includes the steps of:
    determining an average length of observed bursts in the received packet stream over a time interval;
    determining an average length of bursts expected for a random loss packet-based network; and
    determining the burst ratio from the average length of observed bursts and the average length of bursts for the random loss packet network.

14. The method of claim 11 wherein the determining the burst ratio step determines the burst ratio from $1/(1\alpha-\beta)$, wherein $\alpha$ is a probability of losing packet n if packet n−1 was found and $\beta$ represents a probability of losing packet n if packet n−1 was lost.

15. A method comprising the steps of:
    testing a packet server in such a way as to determine a burst ratio; and
    associating the burst ratio as a figure of merit for the packet server.

16. The method of claim 15 wherein the testing step determines the burst ratio by:
    determining that number of packets from a received packet stream that are lost over a time period; and determining a number of expected packets to be lost for the received packet stream in accordance with a random loss model.

17. The method of claim 15 wherein the testing step determines the burst ratio by:
determining an average length of observed bursts in a received packet stream over a time interval;
determining an average length of bursts expected for a random loss packet-based network; and
determining the burst ratio from the average length of observed bursts and the average length of bursts for the random loss packet network.

18. The method of claim 15 wherein the testing step determines the burst ratio $1/(1+\alpha-\beta)$, wherein $\alpha$ is a probability of losing packet n if packet n−1 was found and $\beta$ represents a probability of losing packet n if packet n−1 was lost.

19. A packet server comprising:
a receiver for receiving a stream of packets; and
a processor for (a) determining that number of packets from the received packet stream that are lost over a time period, (b) determining a number of expected packets to be lost for the received packet stream in accordance with a random loss model, and (c) determining a burst ratio from the determined number of packets lost to the number of expected packets to be lost.

20. The apparatus of claim 19 wherein the processor determines the number of packets lost by determining an average length of observed bursts in the received packet stream over the time interval.

21. The apparatus of claim 20 wherein the processor determines the number of packets expected to be lost by determining an average length of bursts expected for a random loss packet-based network.

22. The apparatus of claim 21 wherein the processor determines the burst ratio by a ratio of the average length of observed bursts in the received packet stream over the time interval to the average length of bursts expected for a random loss packet-based network.

23. A packet server comprising:
a receiver for receiving a stream of packets; and
a processor for a burst ratio for the received packet stream, wherein the burst ratio equals $1/(1+\alpha-\beta)$, wherein $\alpha$ is a probability of losing packet n if packet n−1 was found and $\beta$ represents a probability of losing packet n if packet n−1 was lost.

24. A packet server comprising:
a receiver for receiving a stream of packets; and
a processor for (a) determining a burst ratio for the received packet stream, the burst ratio being a ratio of a function of experienced packet loss to a loss expectation for the packet stream, and (b) changing the processing for the received packet stream as a function of the determined burst ratio.

25. The apparatus of claim 24 wherein the processor changes the processing by altering a priority level for the received packet stream.

26. The apparatus of claim 24 wherein the processor determines the burst ratio by determining that number of packets from the received packet stream that are lost over a time period, and determining a number of expected packets to be lost for the received packet stream in accordance with a random loss model.

27. The apparatus of claim 24 wherein the processor determines the burst ratio by determining an average length of observed bursts in the received packet stream over a time interval, and determining an average length of bursts expected for a random loss packet-based network, and determining the burst ratio from the average length of observed bursts and the average length of bursts for the random loss packet network.

28. The apparatus of claim 24 wherein the processor determines the burst ratio from $1/(1+\alpha-\beta)$, wherein $\alpha$ is a probability of losing packet n if packet n−1 was found and $\beta$ represents a probability of losing packet n if packet n−1 was lost.

29. A method of processing packets for use in a packet server, the method comprising the steps of:
receiving a stream of packets; and characterized by,
determining a burst ratio for the received packet stream, said burst ratio being a measure of burstiness of a packet network and based on observed packet loss for the received packet stream over a period of time and expected packet loss for the received stream of packets for a random loss packet based network; and
changing the processing for the received packet stream as a function of the determined burst ratio by altering an associated priority level for the received packet stream.

30. The method of claim 29 wherein the changing step alters a priority level for the received pocket stream.

31. The method of claim 29 wherein the determining the burst ratio step includes the steps of:
determining that number of packets from the received packet stream that are lost over a time period; and
determining a number of expected packets to be lost for the received packet stream in accordance with a random loss model, packets in a random loss model having an equal probability of loss.

32. The method of claim 29 wherein the determining the burst ratio step includes the steps of:
determining an average length of observed bursts in the received packet stream over a time interval;
determining an average length of bursts expected for a random loss packet-based network, packets in a random loss model having an equal probability of loss; and
determining the burst ratio from the average length of observed bursts and the average length of bursts for the random loss packet network.

33. The method of claim 29 wherein the determining the burst ratio step determines the burst ratio from $1/(1+\alpha-\beta)$, wherein $\alpha$ a is a probability of losing packet n if packet n−1 was found and $\beta$ represents a probability of losing packet n if packet n−1 was lost.

34. A packet server apparatus comprising:
a receiver adapted to receive a stream of packets; and characterized by,
a processor operable to (a) determine a burst ratio for the received packet stream, said burst ratio being a measure of burstiness of a packet network and based on observed packet loss for the received packet stream over a period of time and expected packet loss for the received stream of packets for a random loss packet based network and (b) to change the processing for the received packet stream as a function of the determined burst ratio by altering an associated priority level for the received packet stream.

35. The apparatus of claim 34 wherein the processor changes the processing by altering a priority level for the received packet stream.

36. The apparatus of claim 34 wherein the processor determines the burst ratio by determining that number of packets from the received packet stream that are lost over a time period, and determining a number of expected packets to be lost for the received packet stream in accordance with a random loss model, packets in a random loss model having an equal probability of loss.

37. The apparatus of claim 34 wherein the processor determines the burst ratio by determining an average length of observed bursts in the received packet stream over a time interval, and determining an average length of bursts expected for a random loss packet-based network, packets in a random loss model having an equal probability of loss, and determining the burst ratio from the average length of observed bursts and the average length of bursts for the random loss packet network.

38. The apparatus of claim 34 wherein the processor determines the burst ratio burst ratio from $1/(1+\alpha-\beta)$, wherein $\alpha$ is a probability of losing packet n if packet n−1 was found and $\beta$ represents a probability of losing packet n if packet n−1 was lost.

39. A method of processing packets for use in a packet server, the method comprising the steps of:

receiving a stream of packets; and characterized by, determining a burst ratio for the received packet stream (305, 405), said burst ratio being a measure of burstiness of a packet network and based on observed packet loss and expected packet loss of the received stream of packets;

wherein the determining the burst ratio step includes the steps of:

determining an average length of observed bursts in the received packet stream over a time interval;

determining an average length of bursts expected for a random loss packet-based network, packets in a random loss model having an equal probability of loss; and determining the burst ratio from the average length of observed bursts and the average length of bursts for the random loss packet network.

40. The method of claim 39, further including the step of signaling other packet servers in the network regarding the determined burst ratio for the received packet stream.

41. The method of claim 39 further including the step of altering a priority level for the received packet stream.

42. A method of processing packets for use in a packet server, the method comprising the steps of:

receiving a stream of packets; and characterized by, determining a burst ratio for the received packet stream (305, 405), said burst ratio being a measure of burstiness of a packet network and based on observed packet loss and expected packet loss of the received stream of packets;

wherein the burst ratio is determined from $1/(1+\alpha-\beta)$, wherein $\alpha$ is a probability of losing packet n if packet n−1 was found and $\beta$ represents a probability of losing packet n if packet n−1 was lost.

43. A packet server apparatus comprising:

a receiver adapted to receive a stream of packets; and characterized by, a processor operable to determine a burst ratio for the received packet stream, said burst ratio being a measure of burstiness of a packet network and based on observed packet loss and expected packet loss of the received stream of packets, wherein the processor determines the burst ratio by determining an average length of observed bursts in the received packet stream over a time interval, and determining an average length of bursts expected for a random loss packet-based network, packets in a random loss model having an equal probability of loss, and determining the burst ratio from the average length of observed bursts and the average length of bursts for the random loss packet network.

44. The apparatus of claim 43, wherein the processor is further operable to signal other packet servers in the network regarding the determined burst ratio for the received packet stream.

45. The apparatus of claim 24 wherein the processor may alter a priority level for the received packet stream.

* * * * *